United States Patent [19]

Tsukiji

[11] 4,220,061
[45] Sep. 2, 1980

[54] TURNING-TOOL MOUNTING ON A MACHINE TOOL

[75] Inventor: Yoshihiro Tsukiji, Komatsu, Japan

[73] Assignee: Kabushiki Kaisha Komatsu Seisakusho, Tokyo, Japan

[21] Appl. No.: 2,233

[22] Filed: Jan. 9, 1979

[30] Foreign Application Priority Data

Jul. 21, 1978 [JP] Japan .............................. 53-99626[U]

[51] Int. Cl.² ............................................. B23B 29/00
[52] U.S. Cl. ................................................... 82/36 R
[58] Field of Search ..................... 82/36 R, 36 A, 36 B

[56] References Cited

U.S. PATENT DOCUMENTS

| | | | |
|---|---|---|---|
| 1,268,969 | 6/1918 | Harding | 82/36 R |
| 2,389,858 | 11/1945 | Kyle et al. | 82/36 R |
| 3,815,928 | 6/1974 | Komori | 82/36 R |
| 4,084,462 | 4/1978 | Grinage | 82/36 R |

*Primary Examiner*—Harrison L. Hinson
*Attorney, Agent, or Firm*—Armstrong, Nikaido, Marmelstein & Kubovcik

[57] ABSTRACT

In a machine tool wherein a turrethead for holding a rotary tool is mounted on a ram capable of holding a turning tool, the ram is bifurcated to provide a pair of spaced-apart legs. The turrethead is mounted between the legs of the ram. Comprising a mounting body and a cutter affixed thereto, the turning tool is removably mounted under the ram and turrethead, with its mounting body in close contact with both of the ram legs and with the turrethead, and is thus adapted for heavy cutting work. For thus mounting the turning tool, one or more headed pull studs are formed on its mounting body and are releasably engaged within a mounting hole or holes formed in the ram legs and/or turrethead.

13 Claims, 9 Drawing Figures

TURNING-TOOL MOUNTING ON A MACHINE TOOL

BACKGROUND OF THE INVENTION

1. Field of the Invention

This invention relates generally to machine tools, and particularly to a machine tool of the type wherein a turrethead for holding a rotary tool is mounted on a ram which is itself capable of holding a turning tool. More particularly, the invention deals with improved means for securely mounting a turning tool on such a machine tool.

2. Description of the Prior Art

In a prior art machine tool of the type under consideration (shown in FIGS. 1 and 2 of the accompanying drawings), a turrethead for holding a rotary tool is mounted on one side of a ram, and a turning tool is removably mounted on the bottom surface of the ram. The area of this bottom surface of the conventional ram is so small, however, that the turning tool mounted thereon has not been applicable to heavy cutting work.

SUMMARY OF THE INVENTION

It is an object of this invention to provide improved means for mounting a turning tool in position on a machine tool of the above defined type more securely than has been possible heretofore and hence to adapt the turning tool for heavier cutting work.

According to this invention, stated in brief, the ram of the machine tool in question is bifurcated to provide a pair of spaced-apart legs, and a turrethead is mounted between these legs of the ram. Including a mounting body and at least one cutter affixed thereto, a turning tool is removably secured to at least either of the ram and the turrethead, with its mounting body held in contact both with the legs of the ram and with the turrethead therebetween.

In a preferred embodiment the turning tool has a plurality of pull studs formed on its mounting body. These pull studs are received in respective mounting holes formed in the ram legs and in the turrethead, with the enlarged heads of the pull studs releasably engaged within the mounting holes. In another embodiment the turning tool is removably secured only to the ram legs via several pull studs formed on its mounting body. In still another embodiment the turning tool is removably secured only to the turrethead via a single pull stud formed on its mounting body.

Either way the turning tool can be securely supported in contact with the ram legs and the turrethead, so that the tool is capable of withstanding reactive forces from heavy cutting work. With the turning tool mounted in this manner, moreover, the production of vibration by cutting operation is also reduced to a minimum, resulting in the production of highly accurately dimensioned turnings.

The above and other objects, features and advantages of this invention and the manner of attaining them will become more apparent, and the invention itself will best be understood, from the following description and appended claims taken in connection with the accompanying drawings showing several exemplary embodiments of the invention.

DETAILED DESCRIPTION

Figure 1:
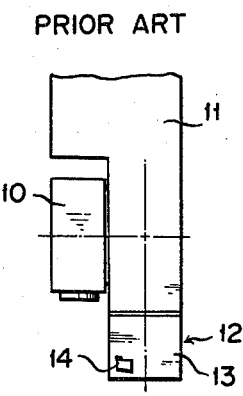
FIG. 1 is an elevational view explanatory of the prior art arrangement of a ram, a turrethead mounted on the ram for holding a rotary tool, and a turning tool also mounted on the ram.
Figure 2:
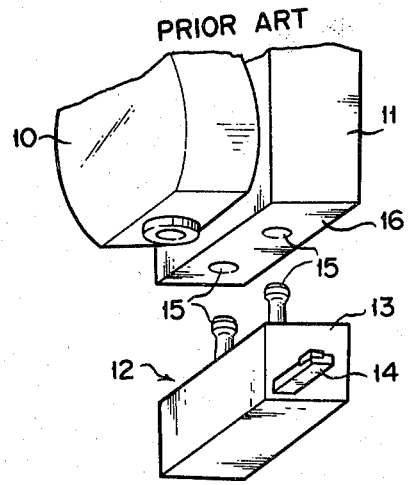
FIG. 2 is a perspective view showing the prior art arrangement of FIG. 1 with the turning tool detached from the ram.

In the prior art arrangement shown in FIGS. 1 and 2 the turrethead 10 for holding a rotary tool is mounted on one side of the ram 11, and the turning tool 12 is mounted under the ram. The turning tool 12 comprises a mounting body 13 and a cutter 14 affixed thereto. The mounting body 13 of the turning tool 12 is removably secured to the ram 11 via mounting means 15.

This prior art configuration is subject to the objection that the turning tool 12 has its mounting body 13 held in contact with only the bottom surface 16 of the ram 11. The construction of the conventional ram 11 is such that the area of its bottom surface 16 cannot possibly be increased so much as desired. Mounted in this manner, the turning tool 12 is not applicable to heavy cutting work.

The present invention will now be described in terms of a first preferable embodiment thereof shown in FIGS. 3, 4 and 5. With reference first and in particular to FIG. 3, there is shown at 20 a ram which is bifurcated into the shape of an inverted U to provide a pair of spaced-apart, downwardly extending legs 21 and 22. These legs 21 and 22 of the ram 20 have bottom surfaces 23 and 24 disposed in a common horizontal plane. Formed in each of these bottom surfaces 23 and 24 of the ram legs 21 and 22 are a pair of mounting holes 25 to be detailed subsequently.

Mounted between the pair of ram legs 21 and 22 is a turrethead 26 having a bottom surface 27 disposed in a plane above the plane of the bottom surfaces 23 and 24 of the ram legs. The turrethead 26 has a mounting hole 28, having its entrance end bounded by a raised annular rim 29, that is formed in its bottom surface 27 for use in mounting a rotary tool (not shown). As will become apparent from the following description, this mounting hole 28 in the turrethead 26 is also intended for use in mounting a turning tool 30 under the ram 20.

Figure 3:
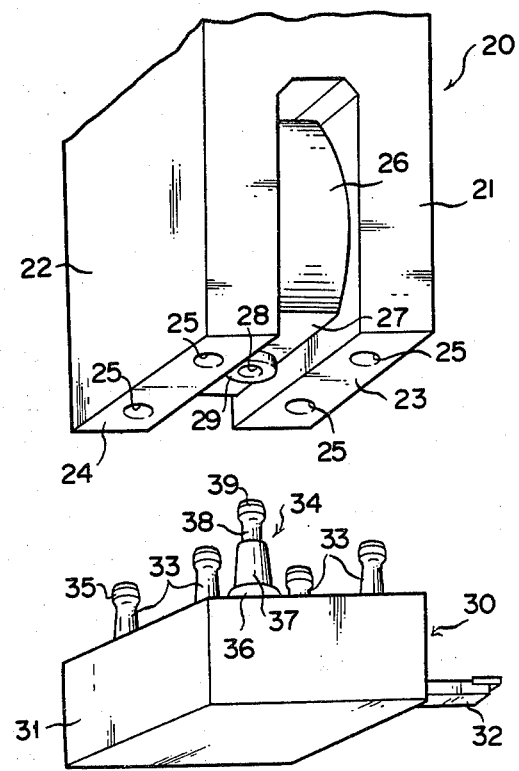
FIG. 3 is a perspective view showing the arrangement of a ram, turrethead and turning tool in accordance with this invention, the view showing the turning tool detached from the ram and turrethead to clearly reveal the means for mounting the turning tool on the ram and turrethead.

Further with reference to FIG. 3, the turning tool 30 comprises a rectangular mounting body 31 and a suitable cutter 32 affixed thereto. The mounting body 31 of the turning tool 30 has formed on its top surface four comparatively short pull studs 33 of identical make to be received in the respective mounting holes 25 in the ram legs 21 and 22. Another, longer pull stud 34 is disposed centrally on the top surface of the turning tool mounting body 31 so as to be received in the mounting hole 28 in the turrethead 26.

Each of the four identical pull studs 33 extends upwardly from the turning tool mounting body 31 and terminates in an enlarged head 35. Mounted on a pedestal 36, the center pull stud 34 comprises an upwardly tapering shank 37 directly overlying the pedestal, a neck 38 over the shank, and an enlarged head 39 over the neck.

Figure 4:
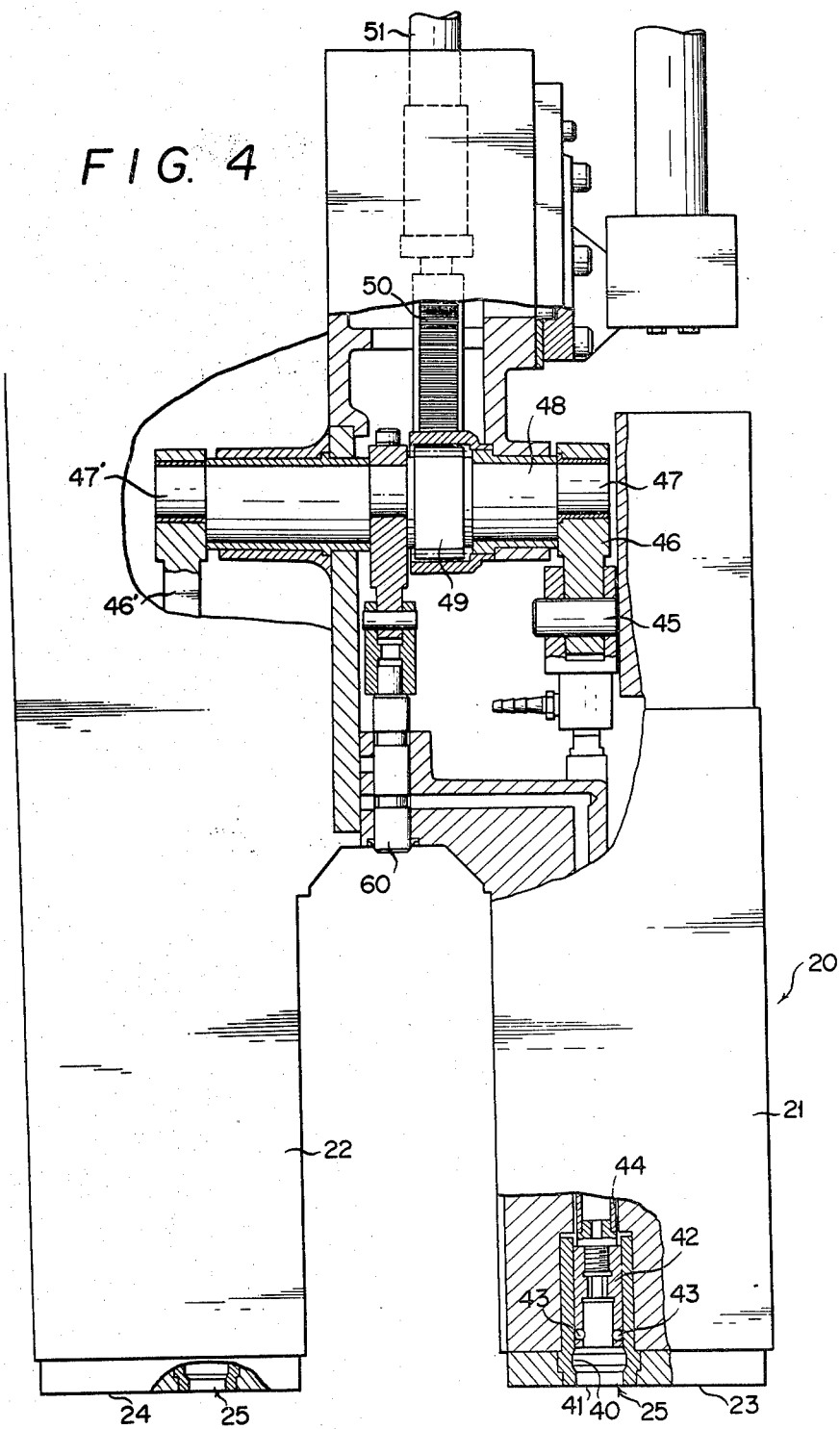
FIG. 4 is an enlarged elevational view of the ram of FIG. 3, the ram being shown partly sectioned to clearly reveal the means for mounting the turning tool thereon.

FIG. 4 is a partly sectioned elevation of the bifurcated ram 20, showing in particular means for releasably engaging the enlarged heads 35 of the four identical pull studs 33 on the turning tool mounting body 31 as the pull studs are received in the respective mounting holes 25 in the ram legs 21 and 22. The four releasably engaging means within the ram 20 are all of identical construction. Only one of such means will therefore be described in conjunction with the particular mounting hole 25 in the right hand ram leg 21 shown in FIG. 4, it being understood that the same description is applicable to the other engaging means.

The mounting hole 25 is cylindrical in shape except for an enlargement or annular recess 40 formed adjacent to its entrance end 41. A mounting sleeve 42 is slidably fitted in the mounting hole 25 for up-and-down motion relative to the ram 20. A plurality of locking balls 43 are carried by the mounting sleeve 42 adjacent to its bottom end. When the mounting sleeve 42 is lowered from its illustrated engaging to disengaging position within the mounting hole 25, by means hereinafter explained, the locking balls 43 are displaceable radially outwardly into the annular recess 40.

At its top end the mounting sleeve 42 is screw-threadedly coupled to an upstanding link 44 slidably supported by the ram 20. The top end of this link 44 is knuckle-jointed at 45 to a crank arm 46 which is pivotally mounted on an eccentric pin 47 projecting from one end of a crankshaft 48 rotatably supported by the same 20 in horizontal disposition. Fixedly mounted on the crankshaft 48 intermediate its ends is a pinion 49 which is in mesh with an upstanding rack 50. This rack is to be moved up and down as by a fluid actuated cylinder (not shown) via a link 51.

It will be noted from FIG. 4 that the crankshaft 48 has another eccentric pin 47' projecting from the other end thereof. This eccentric pin 47' is pivotally connected to a crank arm 46' similar to the crank arm 46. The crank arm 46' is associated with, or included in, the releasably engaging means provided to one of the two mounting holes 25 in the left hand ram leg 22. It will also be understood that another rack-and-pinion mechanism and another crankshaft (both not seen in FIG. 4) are provided for actuating the releasably engaging means provided to the other two mounting holes 25 in the ram legs 21 and 22. Thus, with the up-and-down motion of the actuating link 51, the four mounting sleeves 42 within the mounting holes 25 are to be moved between the engaging and disengaging positions relative to the ram legs 21 and 22.

Figure 5:
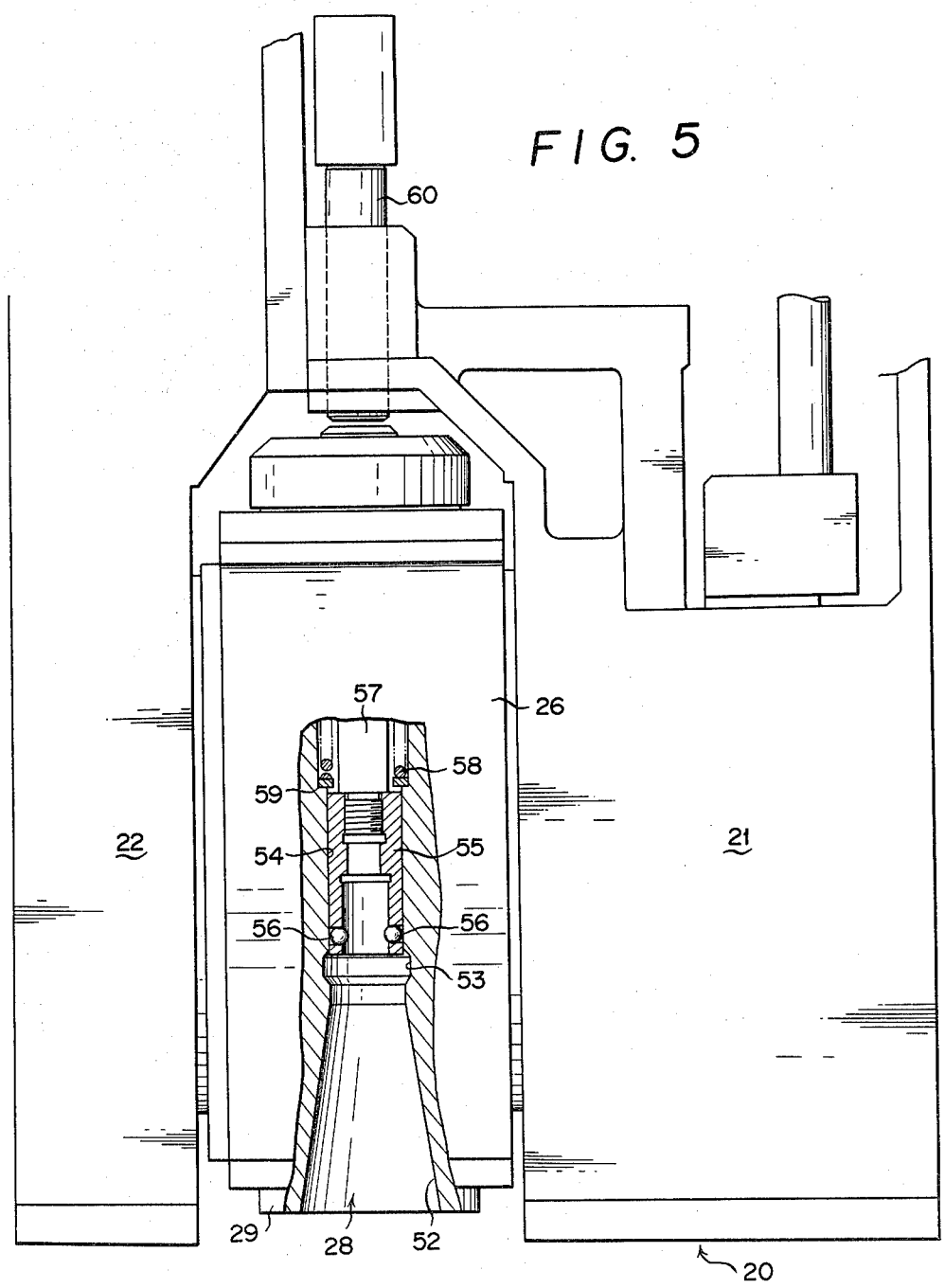
FIG. 5 is an enlarged elevational view of the ram and turrethead of FIG. 3, the view showing the turrethead partly sectioned to clearly reveal the means for mounting the turning tool thereon.

In FIG. 5 are shown in detail the mounting hole 28 in the turrethead 26 and means for releasably engaging the enlarged head 39 of the center pull stud 34 on the turning tool mounting body 31. The mounting hole 28 is formed to comprise a tapered lowermost portion 52 which is shaped and sized to closely receive the tapered shank 37 of the center pull stud 34, an annular recess or enlargement 53 over the tapered lowermost portion, and a cylindrical uppermost portion 54 over the annular recess.

A mounting sleeve 55 is slidably received in the uppermost portion 54 of the mounting hole 28 for up-and-down motion between engaging and disengaging positions relative to the turrethead 26. Like the mounting sleeves 42 within the ram holes 25, the mounting sleeve 55 carries a plurality of locking balls 56 adjacent to its bottom end. When the mounting sleeve 55 is lowered from its illustrated engaging to disengaging position within the mounting hole 28, the locking balls 56 are displaceable radially outwardly into the annular recess 53.

The mounting sleeve 55 has its top end screw-threadedly coupled to the bottom end of an upstanding link 57 mounted within the turrethead 26 for up-and-down motion relative to same. Loosely surrounding the link 57, a helical compression spring 58 extends between an annular spring retainer 59 fixedly mounted within the turrethead 26 and a flange (not shown) formed on the link 57 adjacent to its top end. The link 57 and the mounting sleeve 55 coupled thereto are thus spring biased upwardly and are normally held in the illustrated engaging position relative to the turrethead 26. A push rod 60 is disposed above and in alignment with the link 57 for lowering the mounting sleeve 55 via the link against the bias of the compression spring 58.

For mounting the turning tool 30 in position under the ram 20 and turrethead 26, the mounting sleeves 42 within the mounting holes 25 in the ram legs 21 and 22 may be lowered by the rack-and-pinion mechanisms of FIG. 4 to the disengaging positions, in which the locking balls 43 carried by the mounting sleeves 42 are disposed on a level with the annular recesses 40. The mounting sleeve 55 within the mounting hole 28 in the turrethead 26 may also be lowered by the push rod 60 against the bias of the compression spring 58, to the disengaging position in which the locking balls 56 carried by the mounting sleeve 55 are disposed on a level with the annular recess 53.

The pull studs 33 and 34 on the turning tool mounting body 31 may then be inserted into the respective mounting holes 25 and 28. Since the mounting sleeves 42 and 55 are now held in the disengaging positions as above, the locking balls 43 and 56 carried thereby will be pushed aside into the annular recesses 40 and 53 by the enlarged heads 35 and 39 of the pull studs 33 and 34 as they are inserted into the mounting holes 25 and 28. The pull studs 33 and 34 can thus be inserted fully into the mounting holes 25 and 28. The mounting sleeves 42 and 55 may then be raised to their engaging positions of FIGS. 4 and 5, whereupon the locking balls 43 and 56, forced away from the annular recesses 40 and 53, will be thrusted radially inwardly of the mounting sleeves to positively engage the enlarged heads 35 and 39 of the pull studs 33 and 34 and hence to lock the turning tool 30 in position.

With the turning tool 30 thus mounted in position on the machine tool, the top surface of the turning tool mounting body 31 is held in close contact with the bottom surfaces 23 and 24 of the ram legs 21 and 22. The pedestal 36 of the center pull stud 34 on the turning tool mounting body 31 is further held in abutting contact with the annular rim 29 bounding the entrance end of the mounting hole 28 in the turrethead 26. Supported in this manner, the turning tool 30 is well adapted for heavy cutting work.

For removal of the turning tool 30, the mounting sleeves 42 and 55 within the mounting holes 25 and 28 may again be lowered from the engaging to the disengaging positions. The locking balls 43 and 56 carried by these mounting sleeves are now free to move radially outwardly of the sleeves, into the annular recesses 40 and 53, and hence to release the enlarged heads 35 and 39 of the pull studs 33 and 34. The turning tool 30 can therefore be easily removed from under the ram 20 and turrethead 26.

Figure 6A:
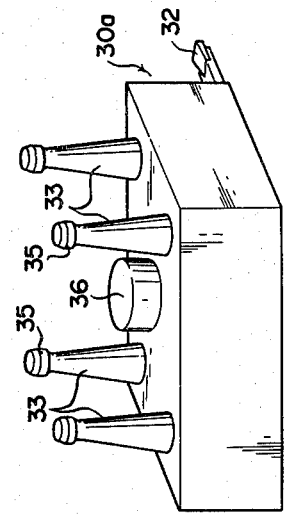
FIGS. 6A through 6C are perspective views of turning tools having various modified forms of mounting means in accordance with the invention.

Another example of turning tool generally designated 30a in FIG. 6A also has the four short pull studs 33 formed on the top surface of the mounting body 31 but has no center pull stud such as shown at 34 in FIG. 3. Only the pedestal of the center pull stud 34 is left as the boss 36 on the turning tool mounting body 31.

This turning tool 30a is to be mounted under the ram 20 and turrethead 26 by inserting the four pull studs 33 into the respective mounting holes 25 in the ram legs 21 and 22. The enlarged heads 35 of these pull studs 33 are of course to be releasably engaged by the means shown in FIG. 4. Thus, just like the turning tool 30, the turning tool 30a has its mounting body 31 in close contact with the bottom surfaces 23 and 24 of the ram legs 21 and 22 and further has the pedestal or boss 36 on the mounting body in abutting contact with the annular rim 29 on the turrethead 26.

Figure 6B:
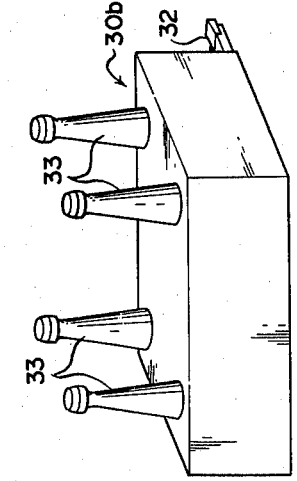

Still another example of turning tool 30b shown in FIG. 6B differs from the turning tool 30a of FIG. 6A in that the boss 36 of the latter is removed from the mounting body 31. This turning tool 30b is also to be mounted in position on the machine tool by inserting the four pull studs 33 into the respective mounting holes 25 in the ram legs 21 and 22. The mounting body 31 of the turning tool 30b can thus be held in close contact with the bottom surfaces 23 and 24 of the ram legs 21 and 22. The mounting body 31 can further be held in contact with the annular rim 29 on the turrethead 26 if the rim surface is disposed on a level with the bottom surfaces 23 and 24 of the ram legs 21 and 22.

Figure 6C:
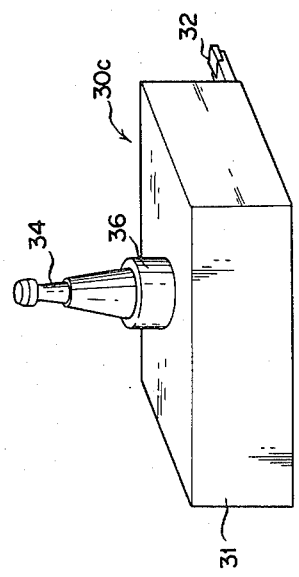

In FIG. 6C is shown a further example of turning tool 30c, in which only the center pull stud 34 complete with the pedestal 36 is formed on the mounting body 31. Although removably coupled only to the turrethead 26 via the center pull stud 34, the turning tool 30c is nevertheless securely supported with its mounting body 31 in contact with the bottom surfaces 23 and 24 of the ram legs 21 and 22 and further with its pull stud pedestal 36 in contact with the annular rim 29 on the turrethead 26.

Figure 7:
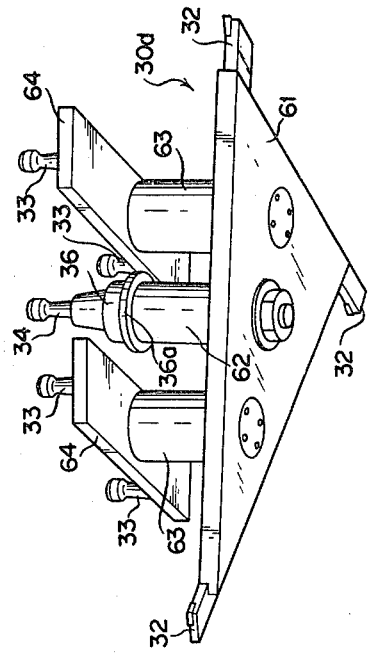
FIG. 7 is a perspective view of a modified turning tool in accordance with the invention.

An additional example of turning tool 30d shown in FIG. 7 differs from the turning tool 30 of FIG. 3 principally in the construction of its mounting body. The turning tool 30d includes a base plate 61 which is shown to be triangular in shape, having three cutters 32 affixed to its respective angles. The center pull stud 34 is fixedly mounted approximately centrally on the base plate 61 via spacer column 62. Formed between center pull stud 34 and spacer column 62 is a flange 36a which is equivalent in function to the pedestal or boss 36 seen in FIGS. 3, 6A and 6C.

Another pair of spacer columns 63 are fixedly mounted on the base plate 61, on opposite sides of the center spacer column 62. Secured to the top of each spacer column 63, in parallel relationship to the base plate 61, is a rectangular mounting plate 64 which is approximately equal in size to the bottom surface 23 or 24 of one of the ram legs 21 and 22. Each mounting plate 64 has fixedly mounted thereon the pair of pull studs 33 to be received in the pair of mounting holes 25 in one of the ram legs 21 and 22.

This turning tool 30d can be mounted under the ram 20 and turrethead 26 in exactly the same manner as the turning tool 30 of FIG. 3. When mounted, the turning tool 30d has its pair of mounting plates 64 in close contact with the bottom surfaces 23 and 24 of the ram legs 21 and 22 and further has its center pull stud flange 36a in abutting contact with the annular rim 29 on the turrethead 26. It will thus be seen that in this turning tool 30d, the base plate 61, spacer columns 62 and 63, and mounting plates 64 correspond in combination to the mounting body 31 of the turning tool 30.

Although illustrative embodiments of this invention have been described in detail herein with reference to the accompanying drawings, it is to be understood that the invention is not limited to those precise embodiments and that various changes and modifications may be effected therein by those familiar with the art without departing from the spirit or scope of the invention as expressed in the following claims.

What is claimed is:

1. In a machine tool, in combination, a ram bifurcated to provide a pair of spaced-apart legs, a turrethead mounted between the pair of legs of the ram, a turning tool including a mounting body and a cutter carried thereby, the mounting body of the turning tool being disposed in contact both with the legs of the ram and with the turrethead, and means for removably securing the mounting body of the turning tool to at least either of the ram and the turrethead.

2. The invention of claim 1, wherein the removably securing means comprises a plurality of pull studs formed on the mounting body of the turning tool, each pull stud having an enlarged head, there being a plurality of mounting holes formed in the legs of the ram for receiving the respective pull studs, and means within the ram for releasably engaging the enlarged heads of the pull studs within the mounting holes.

3. The invention of claim 2, wherein the removably securing means further comprises an additional pull stud formed on the mounting body of the turning tool, the additional pull stud also having an enlarged head, there being an additional mounting hole formed in the turrethead for receiving the additional pull stud, and means within the turrethead for releasably engaging the enlarged head of the additional pull stud within the additional mounting hole.

4. The invention of claim 3, wherein the additional pull stud overlies a pedestal formed on the mounting body of the turning tool, the pedestal being held in abutting contact with the turrethead.

5. The invention of claim 2, further comprising a boss formed on the mounting body of the turning tool for abutting contact with the turrethead.

6. The invention of claim 1, wherein the removably securing means comprises a pull stud formed approximately centrally on the mounting body of the turning tool, the pull stud having an enlarged head, there being a mounting hole formed in the turrethead for receiving the pull stud, and means within the turrethead for releasably engaging the enlarged head of the pull stud within the mounting hole.

7. The invention of claim 6, wherein the pull stud overlies a pedestal formed on the mounting body of the turning tool, and wherein the mounting body of the turning tool is held in contact with the turrethead via the pedestal of the pull stud.

8. The invention of claim 1, wherein the mounting body of the turning tool comprises a base having at least one cutter affixed thereto, spacer means on the base, and a pair of mounting plates secured to the base via the spacer means, the mounting plates being held in contact with the respective legs of the ram.

9. The invention of claim 8, wherein the removably securing means comprises a plurality of pull studs formed on the mounting plates of the turning tool, each pull stud having an enlarged head, there being a plurality of mounting holes formed in the legs of the ram for receiving the respective pull studs, and means within the ram for releasably engaging the enlarged heads of the pull studs within the mounting holes.

10. The invention of claims 8 or 9, wherein the removably securing means comprises a center pull stud formed on the spacer means of the turning tool and located approximately centrally on the mounting body, the center pull stud having an enlarged head, there being a mounting hole formed in the turrethead for receiving the center pull stud, and means within the turrethead for releasably engaging the enlarged head of the center pull stud within the mounting hole.

11. In a machine tool, in combination, a ram bifurcated to provide a pair of spaced-apart legs having end surfaces disposed in coplanar relationship to each other, a turrethead mounted between the legs of the ram, a turning tool including a mounting body and a cutter carried thereby, the mounting body of the turning tool being disposed in close contact with both of the end surfaces of the legs of the ram and further in contact with the turrethead, and means for removably securing the mounting body of the turning tool to at least either of the ram and the turrethead.

12. The invention of claim 11, wherein the mounting body of the turning tool is in the form of a rectangular block having one of its surfaces held in close contact with the end surfaces of the legs of the ram and also in contact with the turrethead.

13. The invention of claim 11, wherein the mounting body of the turning tool comprises a base carrying at least one cutter thereon, spacer means on the base, and a pair of mounting plates secured to the base via the spacer means, the mounting plates of the turning tool being held in close contact with the respective end surfaces of the legs of the ram.

* * * * *